(12) United States Patent
Philipson et al.

(10) Patent No.: US 7,299,116 B2
(45) Date of Patent: Nov. 20, 2007

(54) CONTROL SYSTEM FOR A POWERED VEHICLE

(75) Inventors: Niklas Philipson, Stockholm (SE); Jim Fainberg, Oslo (NO)

(73) Assignee: Visual Act Scandinavia AB, Saltsjo-Boo (SE)

(*) Notice: Subject to any disclaimer, the term of this patent is extended or adjusted under 35 U.S.C. 154(b) by 359 days.

(21) Appl. No.: 10/501,951

(22) PCT Filed: Jan. 22, 2003

(86) PCT No.: PCT/SE03/00108

§ 371 (c)(1),
(2), (4) Date: Nov. 9, 2004

(87) PCT Pub. No.: WO03/062935

PCT Pub. Date: Jul. 31, 2003

(65) Prior Publication Data

US 2005/0065676 A1 Mar. 24, 2005

(30) Foreign Application Priority Data

Jan. 22, 2002 (SE) .................................. 0200200

(51) Int. Cl.
*G01C 22/00* (2006.01)
(52) U.S. Cl. ...................................................... 701/24
(58) Field of Classification Search .................. 701/24
See application file for complete search history.

(56) References Cited

U.S. PATENT DOCUMENTS 5,416,477 A * 5/1995 Shibata ........................ 340/988
5,456,332 A 10/1995 Borenstein
5,823,884 A 10/1998 Ager
6,289,270 B1 * 9/2001 Baumgarten ................. 701/26

FOREIGN PATENT DOCUMENTS

JP 7-13622 1/1995

OTHER PUBLICATIONS

International Search Report Apr. 17, 2003.
International Preliminary Examination Report Dec. 9, 2003.

* cited by examiner

*Primary Examiner*—Thu V. Nguyen
(74) *Attorney, Agent, or Firm*—Nixon & Vanderhye P.C.

(57) ABSTRACT

A control system for a powered vehicle describes a desired movement of the vehicle and communicates the movement to the vehicles drive system. The powered vehicle comprises a chassis and at least three rolling means mounted on the chassis for engaging a surface over which the vehicle moves. The drive system comprises at least two drive units, each comprising first and second driving means, co-operatively operable to provide both propulsion and steering of the drive units. The control system comprises a computing means for calculating a desired movement of the vehicle, wherein translation of the vehicle is calculated in the form of a continuous cubic function and rotation of the vehicle is calculated in the form of a linear function. The control system also comprises a communicating means for transmitting the desired movement to the at least two drive units to move the vehicle in accordance with the desired movement.

16 Claims, 3 Drawing Sheets

CONTROL SYSTEM FOR A POWERED VEHICLE

This application is the US national phase of international application PCT/SE03/00108 filed 22 Jan. 2003, which designated the US and claims priority to SE Application No. 0200200-4, filed 22 Jan. 2002. The entire contents of these applications are incorporated herein by reference.

TECHNICAL FIELD OF THE INVENTION

The present invention relates in a first aspect to a control system for a powered vehicle.

In a second aspect the present invention relates to a method of controlling a movement of a powered vehicle.

In a third aspect the present invention relates to at least one computer program product for controlling a movement of a powered vehicle.

DESCRIPTION OF RELATED ART

The theatre has automated much of the equipment used for movement of scenery and lighting. Most of stage activity involves simply moving scenery about the stage. Automated systems for doing this have been limited by poor radio communication, lack of accuracy and navigation, high noise and high costs.

The document U.S. Pat. No. 5,823,884 discloses a powered stage wagon comprising a chassis to which there is mounted a plurality of rolling support means, each of which is located at respective corner of the chassis. The powered stage wagon also comprises a first and a second drive means, both mounted on the chassis in engagement with the surface over which the stage wagon is to move and are mutually spaced. The document describes a method of calculating a travel path along which the stage wagon may be moved from a current position to a desired position. The method comprising the steps of calculating for each of said drive means the bisector of a line joining the current location of said drive means and the location of said drive means when the stage wagon has moved to its desired position; determining the point of intersection of the two bisectors; calculating for each of said drive means the length of an arc centred on said point of intersection and passing through both the current location of said drive means and the location of said drive means when the stage wagon has moved to its desired position; controlling the ratio of the rotational speeds of the first and second drive means in accordance with the ratio of said arc lengths; and controlling the relative orientation of said first and second drive means so that each of said drive means continuously defines a tangent to the respective arc associated with the drive means concerned.

One main disadvantage with the method of calculating a travel path according to the document U.S. Pat. No. 5,823,884 is that it limits paths to certain predefined combinations of translation and rotation. Another disadvantage is that the method does not correct for any physical errors in movement that might occur.

SUMMARY OF THE INVENTION

It is an object of the present invention to solve the above mentioned problems.

According to the present invention there is provided in a first aspect a control system for a powered vehicle for describing a desired movement of said vehicle, and communicating said movement to a drive system of said vehicle. The powered vehicle comprising a chassis, at least three rolling means mounted on said chassis for engagement with a surface over which said vehicle is to move. The drive system comprises at least two drive units, each comprising a first driving means and a second driving means, co-operatively operable to provide both propulsion and steering of said drive unit and consequently said vehicle. The control system also comprises a computing means for calculating a desired movement of said vehicle, wherein translation of said vehicle is calculated in said form of a continuous cubic function, and rotation of said vehicle is calculated in the form of a linear function. The control system also comprises a communicating means for transmitting said desired movement to said desired movement to said at least two drive units to move said vehicle in accordance with the desired movement. One advantage with the control system according to the present invention is that it can move a vehicle along any predefined path, with a predefined change in rotation in accordance with a time scale. Another advantage with this control system is that it is scalable, i.e. it can move any number of vehicles simultaneously along different paths. Another advantage with this control system is that it allows vehicles to move in any direction. It makes no assumptions as to one direction being more natural than another. Yet another advantage with this control system is that it uses the same method of describing any type of movement or path.

A further advantage in his context if said control system also comprises a navigation system for determining an actual position of said vehicle, which actual position is transmitted to said computing means for correcting errors between the actual position and a desired position according to said desired movement of said vehicle.

Furthermore, it is an advantage in this context if said continuous cubic function is a Beziér function of a third power.

A further advantage in his context if Beziér function is expressed in accordance with:

$$x = ap^3 + bp^2 + cp + d$$

$$y = ep^3 + fp^2 + gp + h,$$

wherein a-h are constants and p is a variable satisfying $0 \leq p \leq 1$. Furthermore, it is an advantage in this context if said computing means calculates said constants a-h according to the following expressions:

$$a = x_3 - 3x_2 + 3x_1 - x_0$$

$$e = y_3 - 3y_2 + 3y_1 - y_0$$

$$b = 3x_2 - 6x_1 + 3x_0$$

$$f = 3y_2 - 6y_1 + 3y_0$$

$$c = 3x_1 - 3x_0$$

$$g = 3y_1 - 3y_0$$

$$d = x_0$$

$$h = y_0,$$

wherein $(x_0, y_0)$ is a start position and $(x_3, y_3)$ is an end position of said movement, and $(x_1, y_1)$ and $(x_2, y_2)$ are control positions of said movement.

A further advantage in his context if said movement is made up of at least one segment.

Furthermore, it is an advantage in this context if if said movement is made up of at least two segments, said control system has to apply to the following rules if said vehicle is to move smoothly from one segment to the next:

a start position of the following segment must be the same as an end position of the preceding segment;

a start rotation of the following segment must be the same as an end rotation of the preceding segment;

a starting path of the following segment must be tangent to an end path of the preceding segment; and a starting speed and direction of rotation of the following segment must be the same as an end speed and direction of rotation of the preceding segment.

A further advantage in his context if said computing means also calculates an instantaneous center of said vehicle.

Another object of the invention is to provide a method of controlling, with the aid of a control system, a movement of a powered vehicle. The vehicle comprises a chassis, a drive system, at least three rolling means mounted on said chassis for engagement with a surface over which said vehicle is to move. The drive system comprises at least two drive units, each comprising a first driving means and a second driving means, co-operatively operable to provide both propulsion and steering of said drive unit. The method comprises the following steps:

with a computing means comprised in said control system, to calculate a desired movement of aid vehicle;

by calculating a translation of said vehicle in the form of a continues cubic function; and by calculating a rotation of said vehicle in the form of a linear function; and with a communication means comprised in said control system, to transmit said desired movement to said at least two drive units to move said vehicle in accordance with said desired movement. One advantage with the method according to the present invention is that it can move a vehicle along any predefined path, with a predefined change in rotation in accordance with a time scale. Another advantage with this method is that it is scalable, i.e. it can move any number of vehicles simultaneously along different paths. Another advantage with this method is that it allows vehicles to move in any direction. It makes no assumptions as to one direction being more natural than another. Yet another advantage with this method is that is uses the same method of describing any type of movement or path.

A further advantage in this context is achieved if said method also comprises the steps of:

with a navigation system comprised in said control system, to determine an actual position of said vehicle;

to transmit said actual position to said computing means; and to correct errors between said actual position and a desired position according to said desired movement of said vehicle.

Furthermore, it is an advantage in this context if said continuous cubic function is a Beziér function of a third power.

A further advantage in this context is achieved if said Beziér function is expressed in accordance with:

$$x = ap^3 + bp^2 + cp + d$$

$$y = ep^3 + fp^2 + gp + h,$$

wherein a-h are constants, and p is a variable satisfying $0 \leq p \leq 1$.

Furthermore, it is an advantage in this context if said method also comprises the steps of to calculate said constants a-h according to the following expressions:

$$a = x_3 - 3x_2 + 3x_1 - x_0$$

$$e = y_3 - 3y_2 + 3y_1 - y_0$$

$$b = 3x_2 - 6x_1 + 3x_0$$

$$f = 3y_2 - 6y_1 + 3y_0$$

$$c = 3x_1 - 3x_0$$

$$g = 3y_1 - 3y_0$$

$$d = x_0$$

$$h = y_0,$$

wherein $(x_0, y_0)$ is a start position and $(x_3, y_3)$ is an end position of said movement, and wherein $(x_1, y_1)$ and $(x_2, y_2)$ are control positions of said movement.

A further advantage in this context is achieved if said method also comprises the steps of:

to calculate an instantaneous center and angular velocity of said vehicle; and to calculate speeds and angles of said drive unit.

Furthermore, it is an advantage in this context if said method also comprises the steps of:

if said error will result in abrupt movement of said vehicle, to integrate succeeding corrections; and to add a suitable proportion of said corrections for each time slice.

Another object of the invention is to provide at least one computer program product directly loadable into the internal memory of at least one digital computer. The at least one computer program product comprises software code portions for performing the steps of the method according to the present invention, when said at least one product is/are run on at least one computer. One advantage with the computer program product(s) according to the present invention is that it/they can move a vehicle along any predefined path, with a predefined change in rotation in accordance with a time scale. Another advantage with this product is that it is scalable, i.e. it can move any number of vehicles simultaneously along different paths. Another advantage with this product is that it allows vehicles to move in any direction. It makes no assumptions as to one direction being more natural than another. Yet another advantage with this product is that is uses the same method of describing any type of movement or path.

It should be emphasised that the term "comprises/comprising" when used in this specification is taken to specify the presence of stated features, steps or components but does not preclude the presence of one or more other features, integers, steps, components or groups thereof.

BRIEF DESCRIPTION OF THE DRAWINGS

Embodiments of the invention will now be described with a reference to the accompanying drawings, in which.

DETAILED DESCRIPTION OF EMBODIMENTS

Figure 1:
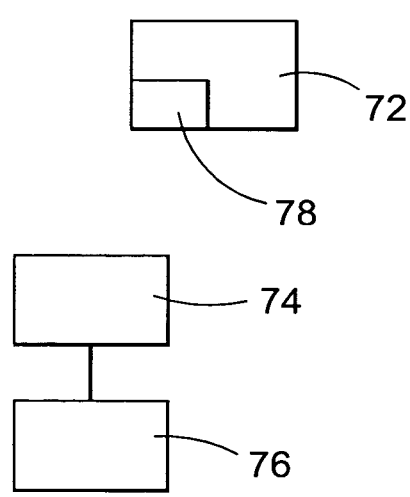
FIG. 1 shows a block diagram of a first embodiment of a control system for a powered vehicle according to the present invention.

FIG. 1 shows a block diagram of a control system 70 for a powered vehide 72 according to the present invention. The powered vehicle 72 comprises a drive system (not disclosed, see FIG. 3), a chassis (not disclosed), at least three rolling means (not disclosed) mounted on said chassis for engagement with a surface over which said vehicle is to move. The drive system comprises at least two drive units (see FIG. 2), each comprising a first driving means and a second driving means, co-operatively operable to provide both propulsion and steering of said drive units. The control system 70 comprises a computing means 74 for calculating a desired movement of said vehicle 72, wherein translation of said vehicle 72 is calculated in the form of a continuous cubic function, and rotation of said vehicle 72 is calculated in the form of a linear function. The control system 70 also comprises a communication means 76 for transmitting said desired movement to said at least two drive units to move said vehicle 72 in accordance with the desired movement. The control system 70 also comprises a navigation system 78 comprised in said vehicle 72 for determining an actual position of said vehicle, which actual position is transmitted to the computing means 74 via said communication means 76 for correcting errors between the actual position and a desired position according to said desired movement of said vehicle 72.

In a preferred embodiment of the control system 70 according to the present invention the continuos cubic function is a Beziér function of a third power.

In a preferred embodiment of the controlsystem 70 according the present invention the Beziér function is expressed in accordance with:

$$x = ap^3 + bp^2 + cp + d$$

$$y = ep^3 + fp^2 + gp + h,$$

wherein a-h are constants and p is a variable satisfying $0 \leq p \leq 1$.

In a preferred embodiment of the control system 70 according to the present invention the constants a-h are calculated in accordance with the following expressions:

$$a = x_3 - 3x_2 + 3x_1 - X_0$$

$$e = y_3 - 3y_2 + 3y_1 - y_0$$

$$b = 3x_2 - 6x_1 + 3x_0$$

$$f = 3y_2 - 6y_1 + 3y_0$$

$$c = 3x_1 - 3x_0$$

$$g = 3y_1 - 3y_0$$

$$d = x_0$$

$$h = y_0$$

wherein $(x_0, y_0)$ is a start position and $(y_3, y_3)$ is an end position of said movement, and $(x_1, y_1)$ and $((x_2, y_2)$ are control positions of said movement.

In a preferred embodiment of the control system 70 according to the present invention the movement is made up of at least one segment.

In a preferred embodiment of the control system 70 according to the present invention, if said movement is made up of at least two segments, the control system 70 has to apply the following rules if said vehicle 72 is to move smoothly from one segment to the next:

a start position of the following segment must be the same as an end position of the preceding segment;

a start rotation of the following segment must be the same as an end rotation of the preceding segment;

a starting path of the following segment must be tangent to an end path of the preceding segment; and a starting speed and direction of rotation of the following segment must be the same as an end sped and direction of rotation of the preceding segment.

In a preferred embodiment of the control system 70 according to the present invention, the computing means 74 also calculates an instant aneous center of said vehicle 72. The movement of any point on the vehicle 72 can always be described as a rotation about the instantaneous center is calculated errors in the vehicles position along the curve and its rotation as reported by the navigation system 78 may be accounted for.

Figure 2:
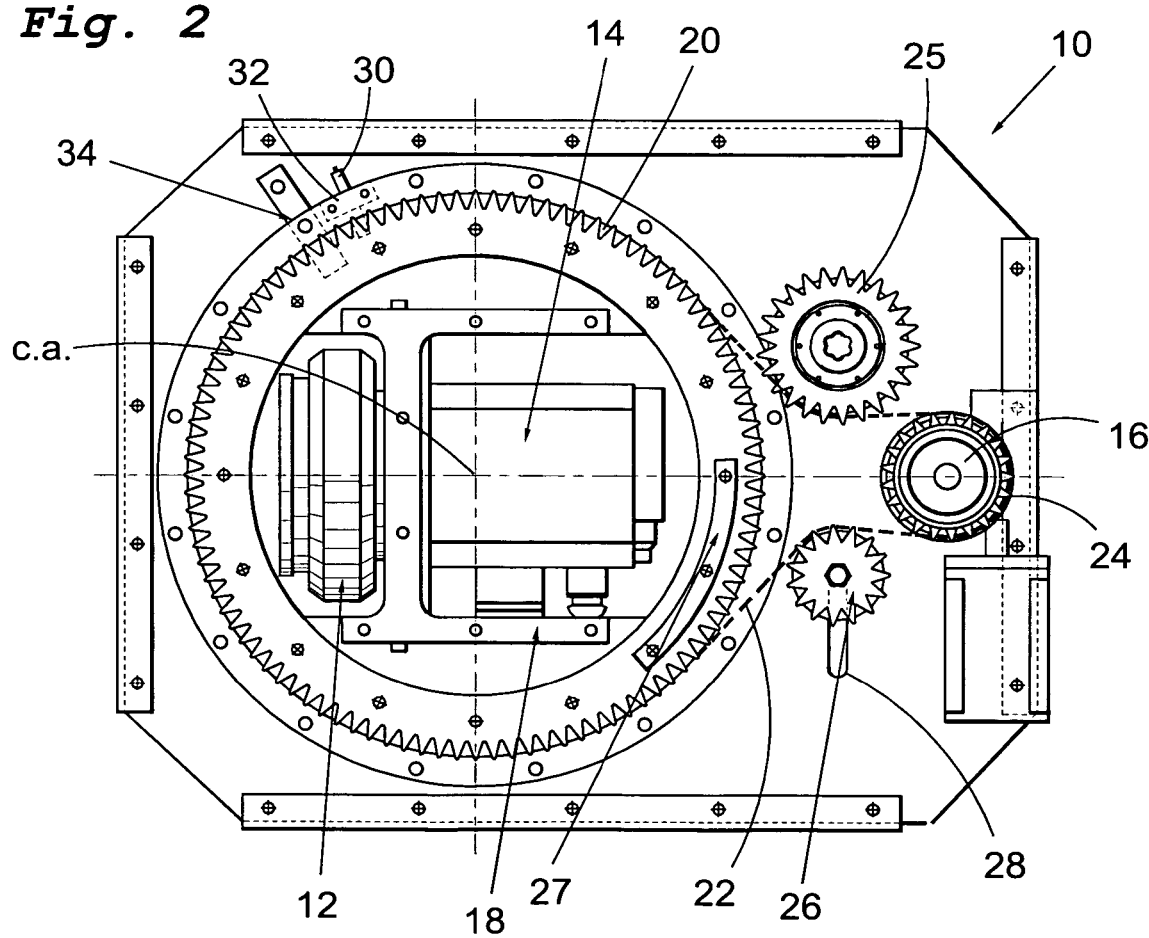
FIG. 2 shows a side view from above of a drive unit that can be used in connection with the present invention.

FIG. 2 shows a side view from above of a drive unit 10 which can be used in connection with the present invention.

The drive unit 10 comprises a rolling means 12 intended to be in frictional engagement with a surface over which said drive unit 10 is intended to move. Preferably, said rolling means 12 is a wheel 12. The drive unit 10 also comprises a first driving means 14, and a second driving means 16, co-operatively operable to provide both propulsion and steering of said drive unit 10. The first driving means 14 is arranged on a rotatable support means 18 rotatable about a center axis, c.a.

The first driving means 14 is operable to rotate said rolling means 12 about a rolling axis. The rolling axis is perpendicular to said center axis, c.a. As is apparent from FIG. 2, the rolling means 12 is displaced a predetermined distance from the center axis, c.a. The second driving means 16 is operable to rotate the support means 18 about said center axis, c.a. In one preferred embodiment of the drive unit 10, which is disclosed in FIG. 1, the first and second driving means 14, 16, each is a servomotor 14, 16. The drive unit 10 also comprises a sprocket means 20 provided on the circumference of the support means 18. The sprocket means 20 is driven by the second driving means 16 by way of a transmission means. In the embodiment disclosed in FIG. 2, the transmission means is a chain 22 which is engaged with said sprocket means 20 and a toothed wheel 24 driven by said second driving means 16. The drive unit 10 disclosed in FIG. 2 also comprises a tension wheel 26 which can be in engagement with the chain 22. The tension wheel 26 can be moved along a groove 28 so as to alter the tension on the chain 22. The drive unit 10 also comprises an inductive sensor 30 arranged in a sensor holder 32 to detect the position of the sprocket means 20, i.e. the orientation of the wheel 12. The drive unit 10 also comprises a rotation limiter 34 arranged in the vicinity of the sprocket means 20. Preferably, the drive unit 10 also comprises a planetary gear-box (not disclosed) mounted on the first driving means 14, and in connection with the wheel 12. The rotatable support means 18 is supported by a ball bearing means (not disclosed). The support means 18 is preferably a plate 18.

Figure 3:
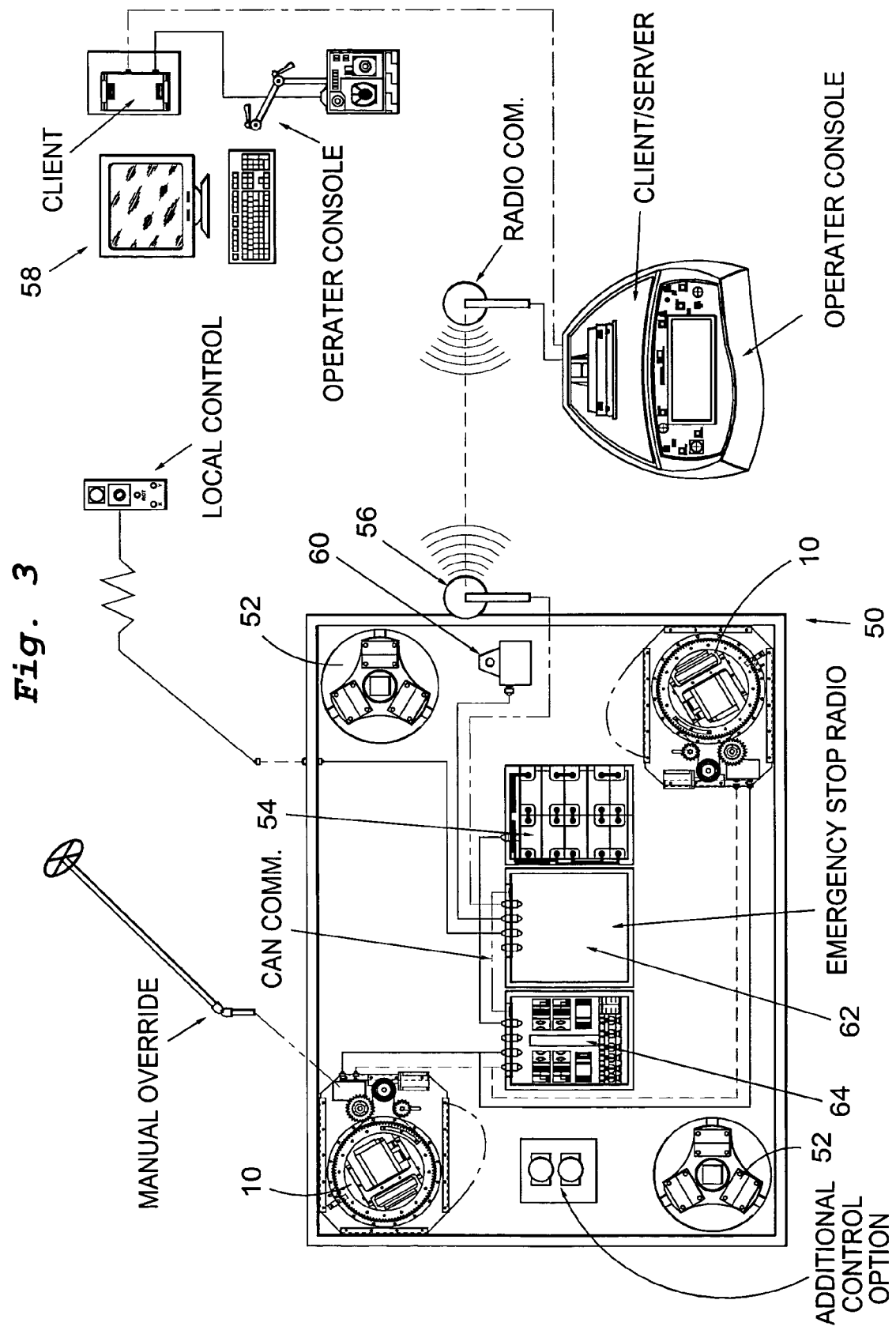
FIG. 3 shows a schematic diagram of a powered vehicle that can be used in connection with the present invention.

FIG. 3 shows a schematic diagram of a powered vehicle 50;72 which can be used in connection with the present invention.

This vehicle 50 comprises two drive units 10, of the same kind disclosed in FIG. 2, and two passive rolling means 52. The two drive units 10 are arranged in two diagonally arranged corners of the vehicle and the two passive rolling means 52 are arrange in the two other corners of the vehicle. The vehicle 50 is e.g. powered by a battery pack 54. The vehicle 50 also comprises a wireless communication means 56 for communicating with a remote computer system 58 to control said drive unit 10, i.e. the movement and steering of the vehicle 50. The vehicle 50 also comprises a laser navigation unit 60, e.g. a laser scanner which makes use of several reflectors mounted along the perimeter of e.g. the stage area. The vehicle 50 also comprises a central processing unit 62 which is connected to the laser navigation unit 60, the wireless communication means 56, the battery pack 54 and a number of servo amplifiers 64 which in turn are connected to the drive units 10.

Figure 4:
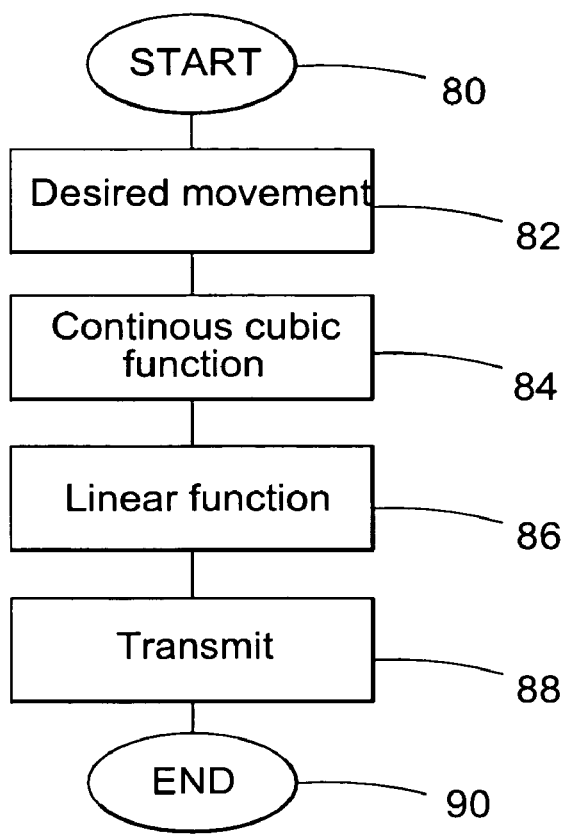
FIG. 4 is a flowchart of a first embodiment of the method of controlling a movement of a powered vehicle according to the present invention.

In FIG. 4 there is a flowchart of a first embodiment of the method of controlling a movement of a powered vehicle according to the present invention. The method begins at block 80. The vehicle comprises a chassis, a drive system, at least three rolling means mounted on said chassis for engagement with a surface over which said vehicle is to move. The drive system comprises at least two drive units, each comprising a first driving means and a second driving means, co-operatively operable to provide both propulsion and steering of said drive units. At block 82 the method continues with the step:

with a computing means comprised in said control system, to calculate a desired movement of said vehicle. The method continues at block 84, to calculate a translation of said vehicle in the form of a continues cubic function The next step, at block 86, consists of calculating a rotation of said vehicle in the form of a linear function.

The method continues at block 88 with the step: with a communication means comprised in the control system, to transmit said desired movement to said at last two drive units to move said vehicle in accordance with said desired movement. The method is completed at block 90.

In a preferred embodiment of the method according to the present invention, the method also comprises the steps of:

with a navigation system comprised in said control system, to determine an actual position of said vehicle;

to transmit said actual position to said computing means; and to correct errors between said actual position and a desired position according to the desired movement of said vehicle.

In a preferred embodiment of the method according to the present invention, the continuos cubic function is a Beziér function of a third power.

In a preferred embodiment of the method according to the present invention, the Beziér function is expressed in accordance with:

$$x=ap^3+bp^2+cp+d$$

$$y=ep^3+fp^2+gp+h,$$

wherein a-h are constants, and p is a variable satisfying $0 \leq p \leq 1$.

In a preferred embodiment of the method according to the present invention, the method also comprises the steps of:

to calculate said constants a-h according to the following expressions:

$$a=x_3-3x_2+3x_1-x_0$$

$$e=y_3-3y_2+3y_1-y_0$$

$$b=3x_2-6x_1+3x_0$$

$$f=3y_2-6y_1+3y_0$$

$$c=3x_1-3x_0$$

$$g=3y_1-3y_0$$

$$d=x_0$$

$$h=y_0$$

wherein $(x_0, y_0)$ is a start position and $(x_3, y_3)$ is an end position of said movement, and wherein $(x_1, y_1)$ and $(x_2, y_2)$ are control positions of said movement.

In a preferred embodiment of the method according to the method according to the present invention, the method also comprises the steps of:

to calculate an instantaneous center and angular velocity of said vehicle; and to calculate speeds and angles of said drive units.

In a preferred embodiment of the method according to the present invention, the method also comprises the steps of:

if said error will result in abrupt movement of said vehicle, to integrate succeeding corrections; and to add a suitable proportion of said correction for each time slice.

Figure 5:
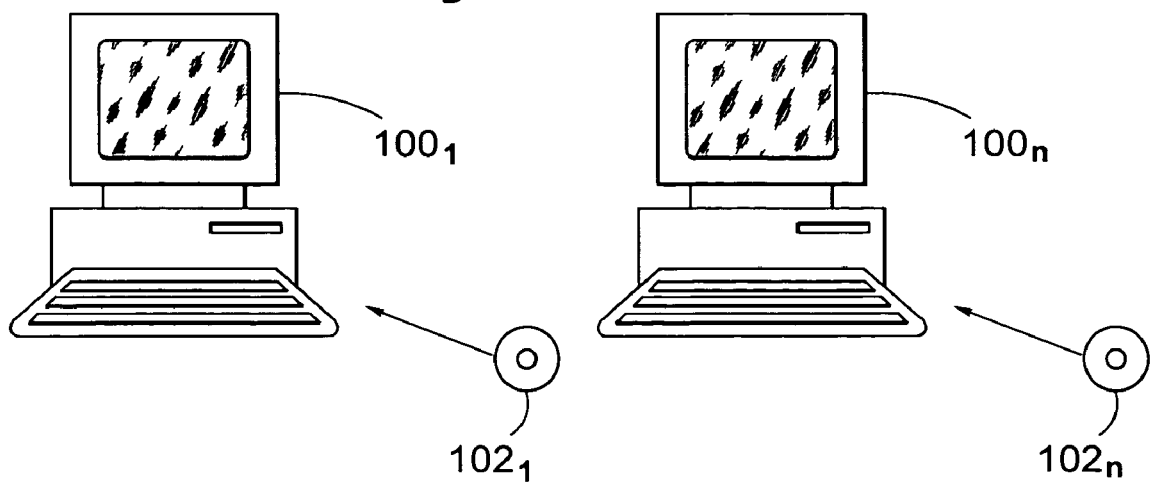
FIG. 5 shows a schematic diagram of some computer program products according to the present invention.

In FIG. 5 there is disclosed a schematic diagram of some computer program products according to the present invention. There is disclosed n different digital computers $100_1, \ldots, 100_n$, wherein n is an integer. There is also disclosed n different computer program products $102_1, \ldots, 102_n$, here showed in the form of compact discs. The different computer program products $102_1, \ldots, 102_n$ are directly loadable into the internal memory of the n different digital computers $100_1, \ldots 100_n$. Each computer program product $102_1, \ldots, 102_n$ comprises software code portions for performing some or all the steps of FIG. 4 when the product(s) $102_1 \ldots, 102_n$ is/are run on said computer(s) $100_1 \ldots, 100_n$. Said computer program products $102_1, \ldots, 102_n$ can e.g. be in the form of floppy disks, RAM disks, magnetic tapes, opto magnetical disks or any other suitable products.

One advantage with the present invention is that it can move a vehicle or robot along any predefined path, with a predefined change in rotation in accordance with a time scale.

Another advantage is that it can move any number of vehicles synchronously, that is move several vehicles as though they were one, transparently to the user and without any mechanical connection or any cables between the vehicles.

Another advantage is that it allows vehicle to be of any size while using the same set of components.

Another advantage with the present invention is that it allows the operator to control the speed of the movements dynamically, while the relation positions of all vehicles under his/her control remain the same.

The invention is not limited to the embodiments described in the foregoing. It will be obvious that many different modifications are possible within the scope of the following claims.

The invention claimed is:

1. A control system for a powered vehicle for describing a desired movement of said vehicle, and communicating said movement to a drive system of said vehicle, wherein said powered vehicle comprising a chassis, at least three rolling means mounted on said chassis for engagement with a surface over which said vehicle is to move, wherein said drive system comprising at least two drive units each comprising a first driving means and a second driving means, co-operatively operable to provide both propulsion and steering of said drive unit, wherein said control system comprises a computing means for calculating a desired movement of said vehicle, wherein translation of said vehicle is calculated in the form of a continuous cubic function and rotation of said vehicle is calculated in the form of a linear function, wherein said control system also comprises a communicating means for transmitting said desired movement to said at least two drive units to move said vehicle in accordance with the desired movement.

2. A control system for a powered vehicle according to claim 1, wherein said control system also comprises a navigation system for determining an actual position of said vehicle, which actual position is transmitted to said computing means for correcting errors between the actual position and a desired position according to said desired movement of said vehicle.

3. A control system for a powered vehicle according to claim 1, wherein said continuous cubic function is a Beziér function of a third power.

4. A control system for a powered vehicle according to claim 3, wherein said Beziér function is expressed in accordance with:

$$x=ap^3+bp^2+cp+d$$

$$y=ep^3+fp^2+gp+h,$$

wherein a-h are constants and p is a variable satisfying $0 \leq p \leq 1$.

5. A control system for a powered vehicle according to claim 4, wherein said computing means calculates said constants a-h according to the following expressions:

$$a=x_3-3x_2+3x_1-x_0$$

$$e=y_3-3y_2+3y_1-y_0$$

$$b=3x_2-6x_1+3x_0$$

$$f=3y_2-6y_1+3y_0$$

$$c=3x_1-3x_0$$

$$g=3y_1-3y_0$$

$$d=x_0$$

$$h=y_0,$$

wherein $(x_0, y_0)$ is a start position and $(x_3, y_3)$ is an end position of said movement, and $(x_1, y_1)$ and $(x_2, y_2)$ are control positions of said movement.

6. A control system for a powered vehicle according to claim 1, wherein said movement is made up of at least one segment.

7. A control system for a powered vehicle according to claim 6, wherein, if said movement is made up of at least two segments, said control system has to apply to the following rules if said vehicle is to move smoothly from one segment to the next:
 a start position of the following segment must be the same as an end position of the preceding segment;
 a start rotation of the following segment must be the same as an end rotation of the preceding segment;
 a starting path of the following segment must be tangent to an end path of the preceding segment; and
 a starting speed and direction of rotation of the following segment must be the same as an end speed and direction of rotation of the preceding segment.

8. A control system for a powered vehicle according to claim 1, wherein said computing means also calculates an instantaneous center of said vehicle.

9. A method of controlling, with the aid of a control system, a movement of a powered vehicle comprising a chassis, a drive system, at least three rolling means mounted on said chassis for engagement with a surface over which said vehicle is to move, wherein said drive system comprises at least two drive units, each comprising a first driving means, and a second driving means, co-operatively operable to provide both propulsion and steering of said drive unit, wherein said method comprises the steps of:
 with a computing means comprised in said control system, calculating a desired movement of said vehicle;
 calculating a translation of said vehicle in the form of a continuous cubic function; and
 calculating a rotation of said vehicle in the form of a linear function; and
 with a communicating means comprised in said control system, transmitting said desired movement to said at least one drive unit to move said vehicle in accordance with said desired movement.

10. A method of controlling, with the aid of a control system, a movement of a powered vehicle according to claim 9, wherein said method also comprises the steps of:
 with a navigation system comprised in said control system, determining an actual position of said vehicle;
 transmitting said actual position to said computing means; and
 correcting errors between said actual position and a desired position according to said desired movement of said vehicle.

11. A method of controlling, with the aid of a control system, a movement of a powered vehicle according to claim 9, wherein said continuous cubic function is a Beziér function of a third power.

12. A method of controlling, with the aid of a control system, a movement of a powered vehicle according to claim 11, wherein said Beziér function is expressed in accordance with:

$$x=ap^3+bp^2+cp+d$$

$$y=ep^3+fp^2+gp+h,$$

wherein a-h are constants, and p is a variable satisfying $0 \leq p \leq 1$.

13. A method of controlling, with the aid of a control system, a movement of a powered vehicle according to claim 12, wherein said method also comprises the steps of:
 to calculate said constants a-h according to the following expressions:

$$a=x_3-3x_2+3x_1-x_0$$

$$e=y_3-3y_2+3y_1-y_0$$

$b = 3x_2 - 6x_1 + 3x_0$ $f = 3y_2 - 6y_1 + 3y_0$ $c = 3x_1 - 3x_0$ $g = 3y_1 - 3y_0$ $d = x_0$ $h = y_0,$ wherein $(x_0, y_0)$ is a start position and $(x_3, y_3)$ is an end position of said movement, and wherein $(x_1, y_1)$ and $(x_2, y_2)$ are control positions of said movement.

14. A method of controlling, with the aid of a control system, a movement of a powered vehicle according to claim 10, wherein said method also comprises the steps of:

to calculate an instantaneous center and angular velocity of said vehicle; and to calculate speeds and angles of said drive unit.

15. A method of controlling, with the aid of a control system, a movement of a powered vehicle according to claim 10, wherein said method also comprises the steps of:

if said error will result in abrupt movement of said vehicle, to integrate succeeding corrections; and to add a suitable proportion of said corrections for each time slice.

16. At least one computer program product (102$_1$, ..., 102$_n$) directly loadable into the internal memory of at least one digital computer (100$_1$, ..., 100$_n$), comprising software code portions for performing, when said at least one product (102$_1$, ..., 102$_n$) is/are run on said at least one computer (100$_1$, ..., 100$_n$), a method of controlling, with the aid of a control system, a movement of a powered vehicle comprising a chassis, a drive system, at least three rolling means mounted on said chassis for engagement with a surface over which said vehicle is to move, wherein said drive system comprises at least two drive units, each comprising a first driving means, and a second driving means, co-operatively operable to provide both propulsion and steering of said drive unit, wherein said method comprises the steps of:

with a computing means comprised in said control system, calculating a desired movement of said vehicle;

calculating a translation of said vehicle in the form of a continuous cubic function; and calculating a rotation of said vehicle in the form of a linear function; and with a communicating means comprised in said control system, transmitting said desired movement to said at least one drive unit to move said vehicle in accordance with said desired movement.

* * * * *